(12) United States Patent
Zhuang et al.

(10) Patent No.: US 9,830,851 B2
(45) Date of Patent: Nov. 28, 2017

(54) WEAR COMPENSATION FOR A DISPLAY

(71) Applicant: Intel Corporation, Santa Clara, CA (US)

(72) Inventors: Zhiming J. Zhuang, Sammamish, WA (US); Jun Jiang, Portland, OR (US)

(73) Assignee: Intel Corporation, Santa Clara, CA (US)

(*) Notice: Subject to any disclaimer, the term of this patent is extended or adjusted under 35 U.S.C. 154(b) by 51 days.

(21) Appl. No.: 14/751,015

(22) Filed: Jun. 25, 2015

(65) Prior Publication Data

US 2016/0379551 A1    Dec. 29, 2016

(51) Int. Cl.
*G09G 5/39* (2006.01)
*G09G 3/3208* (2016.01)
(Continued)

(52) U.S. Cl.
CPC ............. *G09G 3/3208* (2013.01); *G06T 1/20* (2013.01); *G06T 1/60* (2013.01);
(Continued)

(58) Field of Classification Search
CPC ........... G09G 2320/043; G09G 3/3208; G09G 2320/029; G09G 2320/0285;
(Continued)

(56) References Cited

U.S. PATENT DOCUMENTS

2004/0212573 A1    10/2004  Sundahl et al.
2005/0110728 A1    5/2005   Cok
(Continued)

FOREIGN PATENT DOCUMENTS

KR    20150025987 A    3/2015

OTHER PUBLICATIONS

PCT International Search Report, PCT Application No. PCT/US2016/028634, mailing date Jul. 28, 2016, 3 pages.
(Continued)

*Primary Examiner* — Hau Nguyen
(74) *Attorney, Agent, or Firm* — International IP Law Group, P.L.L.C.

(57) ABSTRACT

Techniques for implementing aging compensation for a display are described. An example of an electronic device includes a display comprising pixels, each pixel comprising one or more Light Emitting Diodes (LEDs). The electronic device also includes a display aging compensation unit to receive input frame data corresponding to content to be displayed, adjust the input frame data to generate output frame data based on a degree of aging of the LEDs, and send the output frame data to the display. The electronic device also includes a display aging monitoring and compensation processing unit to accumulate aging data that describes the degree of aging of the LEDs. The aging data is accumulated by sampling the output frame data at a sampling point in accordance with a sampling configuration, and the aging data collected at the sampling point is applied to other pixels in the vicinity of the sampling point. The display aging monitoring and compensation processing unit determines a degree of compensation to apply to the other pixels based on the aging data collected at the sampling point and an aging difference between the other pixels and the sampling point.

23 Claims, 5 Drawing Sheets

(51) Int. Cl.
*G06T 1/20* (2006.01)
*G06T 1/60* (2006.01)

(52) U.S. Cl.
CPC ........... *G09G 2320/029* (2013.01); *G09G 2320/0233* (2013.01); *G09G 2320/0242* (2013.01); *G09G 2320/046* (2013.01); *G09G 2320/048* (2013.01)

(58) Field of Classification Search
CPC ..... G09G 2320/0295; G09G 2320/045; G09G 2320/0242; G09G 2340/16; G06F 11/3003
See application file for complete search history.

(56) References Cited

U.S. PATENT DOCUMENTS

| | | |
|---|---|---|
| 2005/0110807 A1 | 5/2005 | Chang |
| 2006/0022305 A1 | 2/2006 | Yamashita |
| 2006/0164407 A1 | 7/2006 | Cok |
| 2011/0227964 A1 | 9/2011 | Chaji et al. |
| 2012/0133835 A1 | 5/2012 | Van Heesch et al. |
| 2012/0299973 A1 | 11/2012 | Jaffari et al. |
| 2014/0043318 A1 | 2/2014 | Choo et al. |
| 2014/0055500 A1* | 2/2014 | Lai ............... G09G 3/3208 345/690 |
| 2014/0168039 A1 | 6/2014 | Kim et al. |
| 2014/0168192 A1 | 6/2014 | Jeong et al. |
| 2014/0267444 A1 | 9/2014 | Hwang et al. |
| 2014/0267448 A1 | 9/2014 | Albrecht et al. |
| 2014/0306868 A1 | 10/2014 | Chaji |
| 2014/0375701 A1* | 12/2014 | Chaji ............... G09G 3/006 345/690 |
| 2015/0062202 A1 | 3/2015 | Lu |
| 2015/0103106 A1 | 4/2015 | Chaji et al. |

OTHER PUBLICATIONS

PCT International Search Report, PCT Application No. PCT/US2016/028839, mailing date Jul. 28, 2016, 3 pages.
PCT International Search Report, PCT Application No. PCT/US2017/015404, dated May 16, 2017, 3 pages.

\* cited by examiner

WEAR COMPENSATION FOR A DISPLAY

CROSS-REFERENCE TO RELATED APPLICATIONS

The present application is related to U.S. patent application Ser. No. 14/750,889 entitled "Wear Compensation for a Display," filed on Jun. 25, 2015.

TECHNICAL FIELD

This disclosure relates generally to techniques for operating an electronic display. More specifically, the disclosure describes techniques for implementing wear compensation in a display such as a Light Emitting Diode (LED) display or an Organic LED (OLED) display.

BACKGROUND

OLEDs can be used to create digital displays in devices such as television screens, computer monitors, smart phones, gaming consoles, and others. OLEDs provide several advantages compared to other display technologies, including higher color gamut, lighter and thinner display panels, better power efficiency, and others. However, the materials used to make OLEDs tend to degrade based on cumulative usage. Degradation in OLED displays is characterized by the loss of luminance over time. Because the degradation rate is different for the three primary colors and the degree of degradation depends on the individual pixel usage, undesirable effects such as color shift and burn-in can take place.

DETAILED DESCRIPTION

The subject matter disclosed herein relates to techniques to compensate for the wear experienced by an OLED display. As explained above, OLED displays tend to degrade differently depend on the color and the cumulative usages of each individual pixel's, which can lead to color shifting and screen burn-in. This has prevented the widespread adoption of OLED displays in Personal Computers (PCs). To reduce the effects of OLED wear, compensation techniques can be applied to compensate the gradual loss of luminance that OLED displays experience over time. In one type of compensation technique, the display operating history is tracked and used to determine an expected degree of luminance degradation for each pixel. For example, the display input frame data can be accumulated over time to determine the effective aging time experienced by individual pixels. Such tracking can quickly consume a large amount of memory and processing resources.

This disclosure describes techniques to reduce the amount of system resources used for collecting OLED aging data to more manageable levels. More specifically, the present disclosure provides techniques for reducing the number of sample points that are tracked for collecting pixel aging data while ensuring that sufficient pixel aging data is collected for effective wear compensation. Rather than collect aging data for each pixel individually, the aging data can be collected for a reduced number of sampling points within the display panel, each sampling point being a specific pixel in the display panel. The aging data collected for a particular sampling point can be used for the wear compensation of the sampling point and a number of surrounding pixels.

The number of sampling points within a region of the display and the location of the sampling points on the display may be referred to herein as the sampling configuration. The sampling configuration may be affected by a number of factors, including the size and dimensions of the screen, the amount of processing resources and memory available for aging compensation processing, and the type of content being rendered or expected to be rendered on the display. The sampling configuration may be different for different regions of the display screen and may also change depending, for example, on the type of content being rendered on the display.

In some examples, the sampling configuration is determined based on whether the display, or some portion of the display, is displaying static content or dynamic content. Dynamic content is content that tends to change more rapidly over time, such as a streaming video or game graphics. For dynamic images such as video, the changes in the display data tend to be evenly dispersed across all of the pixels of the dynamic image. Dynamic content will tend to cause more uniform aging of the pixels in the corresponding display area. For dynamic images, the aging data for a single sampling point can be used to represent the average aging experienced for a group of pixels in the vicinity of the sampling point. Static content is content that is relatively constant over time, such as an image of a desktop, word document, menu bar, or icon bar. For static content, the pixel data tends to be more constant over time and the aging tends to be more pixel specific. For static content, sampling individual pixels will tend to provide more accurate aging compensation data.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
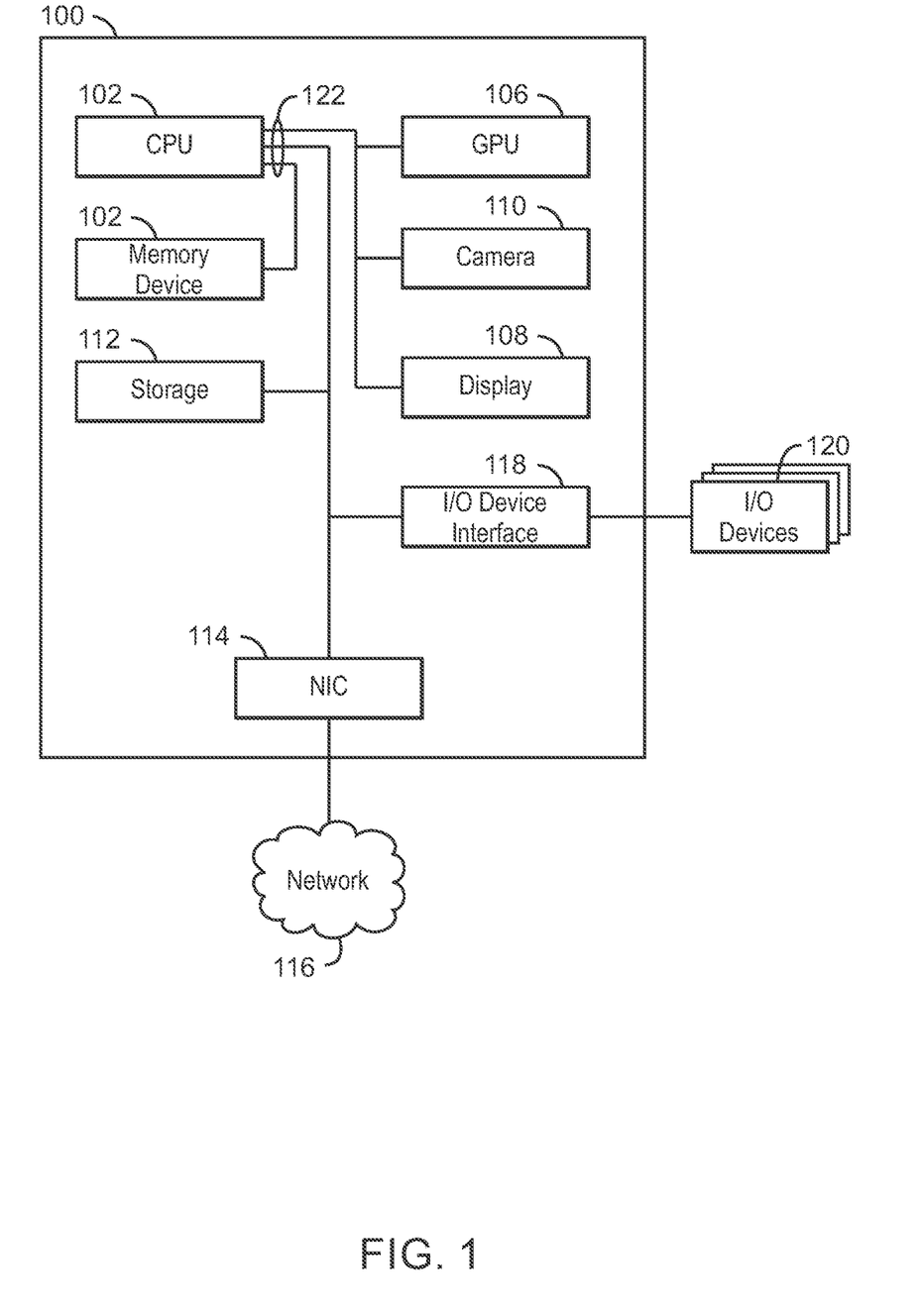
FIG. 1 is a block diagram of an example electronic device that can implement the wear compensation techniques described herein.

FIG. 1 is a block diagram of an example electronic device that can implement the wear compensation techniques described herein. The computing device 100 may be, for example, a computing device such as smart phone, laptop computer, ultrabook, desktop computer, or tablet computer, among others. The computing device 100 may also be a display device such as a digital sign or television, for example. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store data and computer-readable instructions that, when executed by the processor, direct the processor to perform various operations in accordance with embodiments described herein.

The computing device 100 may also include a graphics processor 106 that processes video signals or computer generated graphics. The graphics processor 106 is configured to process data related to the generation of graphics to be sent to a display 108. The display 108 may be a built-in component of the computing device 100 or externally coupled to the computing device 100. In some examples, the display is an OLED display. However, the present techniques may also be implemented in any type of display that use arrayed emitters for display illumination, such as plasma displays, or displays that use other types of LEDs, for example.

The computing device 100 can also include a camera 110 configured to capture still images or video. For example, the camera 110 may be a Web cam. Images or video captured by the camera 110 can be sent to various other components of the computing device 100, such as the display 108.

The computing device 100 may also include a storage device 112. The storage device 112 is a physical memory such as a hard drive, an optical drive, a flash drive, an array of drives, or any combinations thereof. The storage device 112 may also include remote storage devices. The computing device 100 may also include a network interface controller (NIC) 114 configured to connect the computing device 100 through to a network 116. The network 116 may be a wide area network (WAN), local area network (LAN), or the Internet, among others.

The computing device 100 may also include an input/output (I/O) device interface 118 configured to connect the computing device 100 to one or more I/O devices 120. The I/O devices 120 may include, for example, a printer, a scanner, a keyboard, and a pointing device such as a mouse, touchpad, or touchscreen, among others. The I/O devices 120 may be built-in components of the computing device 100, or may be devices that are externally connected to the computing device 100.

Various additional components may be included depending on the design considerations for a particular implementation. For example, the computing device 100 may also include a memory controller hub that handles communications between the processor 102, memory 104, graphics processor 106, I/O device interface 118, and other components.

Communications between various components of the computing device 100 can be performed over one or more data busses 122. The bus architecture shown in FIG. 1 is just one example of a bus architecture that can be used with the techniques disclosed herein. In some examples, the data bus 122 may be a single bus that couples all of the components of the computing device 100 according to a particular communication protocol. Furthermore, the computing device 100 can also include any suitable number of data busses 122 of varying types, which may use different communication protocols to couple specific components of the computing device according to the design considerations of a particular implementation.

The graphics processor may be configured to collect OLED aging data and implement wear compensation based on the OLED aging data. In an OLED display, each pixel may include three diodes, one for the color red, one for the color green, and one for the color blue. For the present disclosure, Red-Green-Blue (RGB) pixels are described. However, it will be appreciated that other arrangements with fewer or more diodes and different colors are also possible. For examples, in addition to the red, green, and blue diodes, each pixel could also have an additional yellow pixel. Each pixel may be activated by a string of data that describes the intensity with which to illuminate of each of the diodes in the pixel. The data that activates the pixels may be referred to herein as RGB data. The term "frame data" refers to the RGB data for all of the pixels for a single frame of display content.

The OLED aging data is a measure of the total accumulated charge that has passed through a particular diode and is a function of the amount of time that a diode has been turned on and the intensity over that time. The graphics processor may collect OLED aging data for each diode of one or more individual pixels. Based on the OLED aging data, the graphics processor can compensate the brightness of each diode of a pixel by adjusting the RGB data before sending the RGB data to the display. The OLED aging data may be collected for one or more sampling points. The OLED aging data collected for a particular sampling point is used to represent the aging of a group of pixels, and can be used for the aging compensation applied a group of pixels surrounding the sampling point.

In some examples, the graphics processor can determine which pixels are to be used as sampling points. The determination of which pixels to use as sampling points can be based on the content being displayed. For example, the graphics processor may use one sampling configuration with fewer sampling points when displaying dynamic content, and another sampling rate with more sampling points when sampling static content. In some examples, different sampling configurations are used for different areas of the screen. The sampling configuration may be determined by the graphics processor or by another component such as the source of the content to be displayed. For example, the sampling configuration can be determined by on analysis of the frame data received by the graphics processor, or the graphics processor may receive an indicator from the source of the content indicating the type of the content, such as whether the content is static or dynamic. In some examples, the sampling configuration is static. For example, the sampling configuration may be specified by a manufacturer of the device and/or a user of the device. In some examples, the sampling configuration may change depending on the content being displayed.

It is to be understood that the block diagram of FIG. 1 is not intended to indicate that the electronic device 100 is to include all of the components shown in FIG. 1. Rather, the electronic device 100 can include fewer or additional components not illustrated in FIG. 1. Furthermore, the components may be coupled to one another according to any suitable system architecture, including the system architecture shown in FIG. 1 or any other suitable system architecture. For example, embodiments of the present techniques can be implemented in a System-On-a-Chip (SOC), or a multi-chip module.

Figure 2:
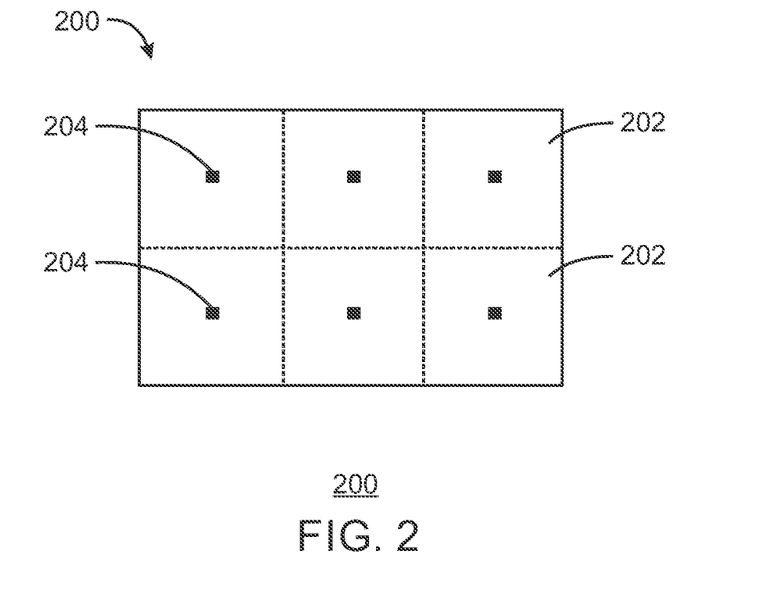
FIG. 2 is a diagram of a display showing an example of a sampling technique.

FIG. 2 is a diagram of a display screen showing an example of a sampling technique. As shown in FIG. 2, the display screen 200 is divided into nine equally sized portions, referred to herein as sampling segments 202. The term sampling segment 202 is used to refer to an area of the display screen 200 in which a single pixel is sampled and the aging data collected for that pixel is used for all of the pixels in that area. Each sampling segment 202 shown in FIG. 2 is associated with a single sampling point 204 at the center of the sampling segment 202. The sampling point 204 refers the pixel for which aging data is collected. The aging data collected for the sampling point 204 can then be attributed to each pixel within the sampling segment 202 and used for the aging compensation applied to each pixel within the corresponding sampling segment 202.

The display screen 200 shown in FIG. 2 can be any suitable size display screen 200, which may be divided into any suitable number of sampling segments 202. Each sampling segment 202 can include several hundred to several thousands of pixels or as few as nine pixels. For example, in one sampling configuration, each sampling segment 292 includes nine pixels with the center pixel being the sampling point 204. In another sampling configuration, the display screen includes a single sampling segment 202 and a single sampling point is used.

The sampling configuration may change depending on content being displayed. For example, while displaying static content, the sampling configuration may be set to a mode in which each pixel is sampled, and while displaying dynamic content, the sampling configuration may be set to a mode in which a smaller number of pixels is sampled. Also, different areas of the display screen 200 may be sampled differently as described below in relation to FIG. 3.

Figure 3:
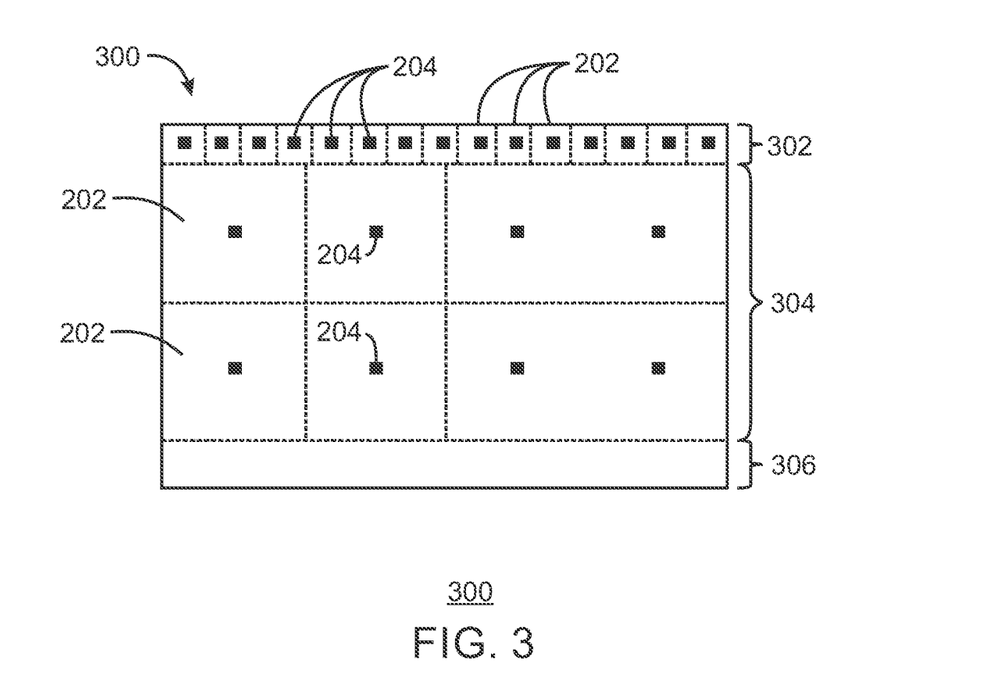
FIG. 3 is a diagram of a display showing another example of a sampling technique.

FIG. 3 is a diagram of a display showing another example of a sampling technique. As shown in FIG. 3, different areas of the display screen 200 can have different sampling configurations. FIG. 3 shows three different sampling configurations for three different areas of the display screen 200 including a first area 302, a second area 304, and a third area 306. The first area 302 is divided into a number of sampling segments 202, each sampling segment sharing a single sampling point 204. The second area is also divided into a number of sampling segments 202 each sharing a single sampling point 204. Each sampling segment 202 in the second area 304 covers a wider area of the display screen 300 compared to the sampling segments 202 in the first area 302. In the third area 306, the pixels are sampled individually. In other words, each sampling segment in the third area 306 is equal to one pixel and each pixel is a separate sampling point.

The sampling configuration show in FIG. 3 may be a result of the type of content being displayed or expected to be displayed. For example, the third area 306 may represent a portion if the display screen 300 that is showing a menu bar that experiences long periods of time in which no change to the content occurs. The first area 302 may represent an area that experiences a higher degree of change over time compared to third area 306, and therefore is divided into larger sampling segments 202 compared to the third portion 306. For example, the first area 302 may be used to display another menu bar. The second area 304 may be an area that experiences a higher degree of change over time compared to the first area 302 and is therefore divided into even larger sampling segments 202 compared to the first area 302. For example, the second area 304 may be an area in which video images are being displayed or are expected to be displayed.

The sampling configuration can change in response to the content currently being displayed. For example, the sampling configuration may change in response to the input frame data received by the graphics processor. The sampling configuration may also change in response to instructions received from another component of the electronic device, such as the operating system running on the main processor. For example, the operating system can respond to the user's interactions with the graphical user interface of the electronic device and adjust sampling configuration accordingly. For example, the third area 306 may correspond with a menu bar that resides at the bottom of the display screen 200. If the user moves the menu bar to the side of the display screen 200, the shape and location of the third area 306 may also change accordingly to track the location of the menu bar. If the user is watching a video in a display window corresponding to the second area 304, and the user maximizes the display window to encompass the entire display screen 300, the sampling configuration may change from the configuration shown in FIG. 3 to the configuration shown in FIG. 2, for example. The sampling configuration can be specified so that some or all of the sampling areas align with the features being displayed. For example, a sampling area may be configured to align with a window of the display screen that is displaying video, while other sampling areas may be aligned with still images such as icons.

Figure 4:
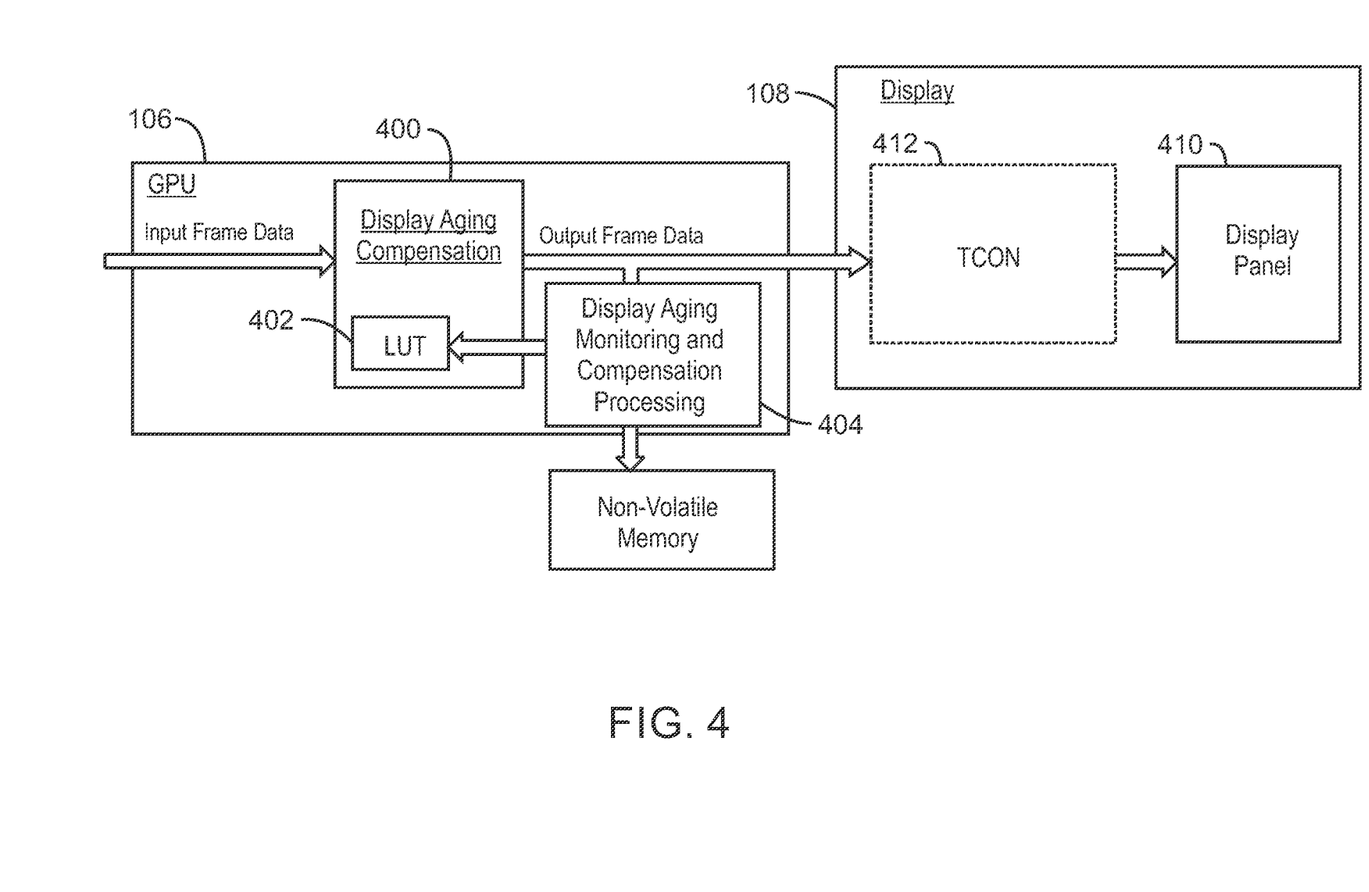
FIG. 4 is a block diagram of an example graphics processing unit configured to monitor device usage and calculate aging data and implement wear compensation based on the aging data.

FIG. 4 is a block diagram of an example graphics processor configured to accumulate aging data and implement wear compensation based on the data. The graphics processor 106 includes a display aging compensation unit 400 and a display aging monitoring and compensation processing unit 404. The display aging compensation unit 400 receives input frame data and adjusts the intensity of each OLED of each pixel. The adjustment for a particular OLED is the adjustment that will compensate the OLED for the amount of aging experienced by that OLED. Intensity adjustments to be applied to each OLED may be stored to a lookup table (LUT) 402 by the display aging monitoring and compensation processing unit 404. The data stored to the lookup table can be based on predetermined device decay models for each type of OLED and relates the amount of OLED aging to the level of compensation for that OLED.

The display aging monitoring and compensation processing unit 404 samples the frame data that is output from the display aging compensation unit 400 to the display 108. The display aging monitoring and compensation processing unit 404 can determine for each pixel of the display, the degree of aging experienced for each OLED based on the frame data. The data, such as RGB data, specifies the intensity by which each OLED in a pixel is driven. The actual degree of aging is a product of the intensity with which the OLED is being driven and the duration that the OLED is driven at the specified intensity. The OLED will be driven at the intensity specified by the output frame data for the duration of one frame, which depends on the refresh rate. For example, for 60 Hertz refresh rate, the display refreshes 60 times per second and the actual duration of one frame is approximately $\frac{1}{60}$ of a second. The sampling frequency can be equal to or less than the refresh rate.

The degree of aging measured for a particular OLED can be used as an input to the LUT 402 to obtain a corresponding degree of compensation to be applied to the OLED to compensate for the aging of the OLED. To acquire the degree of aging from the LUT 402, the LUT 402 is searched using the degree of aging as input, and the degree of compensation is returned as the output. In some examples, the LUT 402 is searched in a linear fashion starting at the first input. This process can be repeated for each OLED and each image frame.

To improve the efficiency of the LUT search, an improved search algorithm can be used for searching the LUT 402. In many cases, neighboring pixels can be expected to experience similar degrees of OLED aging. The improved search algorithm takes advantage of this to reduce the search space of the LUT search performed for some of the OLEDs. In one example of the improved search algorithm, the LUT search for the sampling point starts at the first input and proceeds until the correct output is located. The index at which the correct output was located is saved and used for future LUT searches. For the other pixels within the same sampling segment, the starting point for the LUT search is the saved index that resulted from the LUT search for the sampling point. The LUT search can then proceed upward or downward from the starting point until the correct degree of compensation is located. In this way, the LUT may be searched over a much smaller range of indexes, saving time and processing resources.

The aging data collected at the sampling point can be tracked using a high bit depth, which provides the ability to capture fine details or wider time span. For example, a 32 or 64 bit number may be used to store the aging data for the sampling point. Based on the aging relation between the sampling point and the neighboring pixels within the same sampling segment, a smaller bit depth can be used to track the aging of neighboring pixels within the same sampling segment. In some examples, the same aging data collected for the sampling point can be used for the neighboring pixels in the same sampling segment. In some examples, the aging of the neighboring pixels is represented separately, using a smaller bit depth compared to the sampling point. For example, the neighboring pixels may be represented using an 8 bit or 16 bit number. The aging data collected for a neighboring pixel using the smaller bit depth may represent a difference in aging between the pixel and the sampling point. In some examples, the difference is a known aging relationship between the pixel and the sampling point, e.g., a ratio or delta between aging of neighboring pixel and the sampling point. The degree of compensation to be applied to each of the neighboring pixels can be computed using the sampling point's more accurate aging info and the aging relationship between the sampling point and the neighboring pixel. In some examples, the aging relation between the pixel and the sampling point is tracked. In either case, a smaller bit depth can be used to represent the neighboring pixels without losing accuracy.

The display aging monitoring and compensation processing unit 404 can also store accumulated aging data to a non-volatile memory 406. The non-volatile memory 406 can be the memory device 104 or storage device 112 of FIG. 1, or some other memory device, which may be dedicated to storing the accumulated aging data. The non-volatile memory 406 may also be included in the graphics processor 106 or coupled to the graphics processor 106 through a data bus. Storing the accumulated aging data to the non-volatile memory 406 prevents the aging data from being lost over the life of the display 108, for example, due to power loss.

The accumulated aging data may be the total level of aging experienced by the pixels. Additionally, accumulated aging data may be stored for each pixel individually or for groups of pixels. In implementations wherein the sampling configuration can change, the aging data can be stored for each pixel individually and the compensation can be applied for each pixel individually. In implementations wherein the sampling configuration can change, the aging data can be stored for each pixel individually and the compensation can be applied for each pixel individually. Even if aging data is stored and applied individually, the aging can still be collected for groups of pixels at a time.

As mentioned above, the display aging compensation unit 400 receives input frame data, performs wear compensation based on the accumulated aging data stored to the lookup table 402, and outputs compensated frame data to the display 108. The display 108 includes a display panel 410, which includes the matrix of pixels, and a timing controller (TCON) 412. The timing controller 412 is the data sink for the output frame data and drives the display panel 410. The input frame data can be received from any suitable source. With reference to FIG. 1, the source of the input frame data can be an application running on the processor 102, a network interface such as the NIC 114, a television tuner (not shown), one of the I/O devices 120, or the camera 110, among others.

The sampling configuration used by the display aging monitoring and compensation processing unit 404 may be determined by the graphics processor 106, or may be received by the graphics processor 106 from another component, such as an application running on the processor 102 (FIG. 1). In some examples, the display aging monitoring and compensation unit 404 determines the sampling configuration by analyzing successive frames of input data and identifying the degree of change in the pixels to determine if the content is static or dynamic. The sampling configuration may be set to one value for dynamic content and another value for static content. In some examples, the sampling configuration may be set to a value proportional to the degree of change in the pixels identified by the graphics processor 106. In examples in which the sampling configuration can vary, the number of sampling points will be greater and the size of the sampling segments smaller for more slowly changing, i.e., static, content, and the number of sampling points will be fewer and the size of the sampling segments larger for more quickly changing, i.e., dynamic, content.

In some examples, the graphics processor 106 receives an indicator from an application such as an operating system, wherein the indicator is used to identify the sampling configuration. For example, the indicator may indicate whether the content being displayed is static or dynamic, or the indicator may indicate the actual sampling rate to be used.

The sampling configuration may also be different for different portions of the display panel 410. For example, a window within a display may be showing streaming video, while the background portions surrounding the window may be unchanging. The portions of the display panel 410 used for showing video may be subjected to one sampling configuration, while the background portions may be subjected to a different sampling configuration.

It is to be understood that the block diagram of FIG. 4 is not intended to indicate that the graphics processor 106 is to include all of the components shown in FIG. 4. Rather, the graphics processor 106 can include fewer or additional components not illustrated in FIG. 4. Furthermore, the components can be implemented in hardware or a combination of hardware and software. For example, the components may be implemented in one or more Application Specific Integrated Circuits (ASICs), Field Programmable Gate Array (FPGAs), microcontrollers, or an arrangement of logic gates implemented in one or more integrated circuits, for example. Additionally, the components may be implemented in a single processor or multiple processors.

Figure 5:
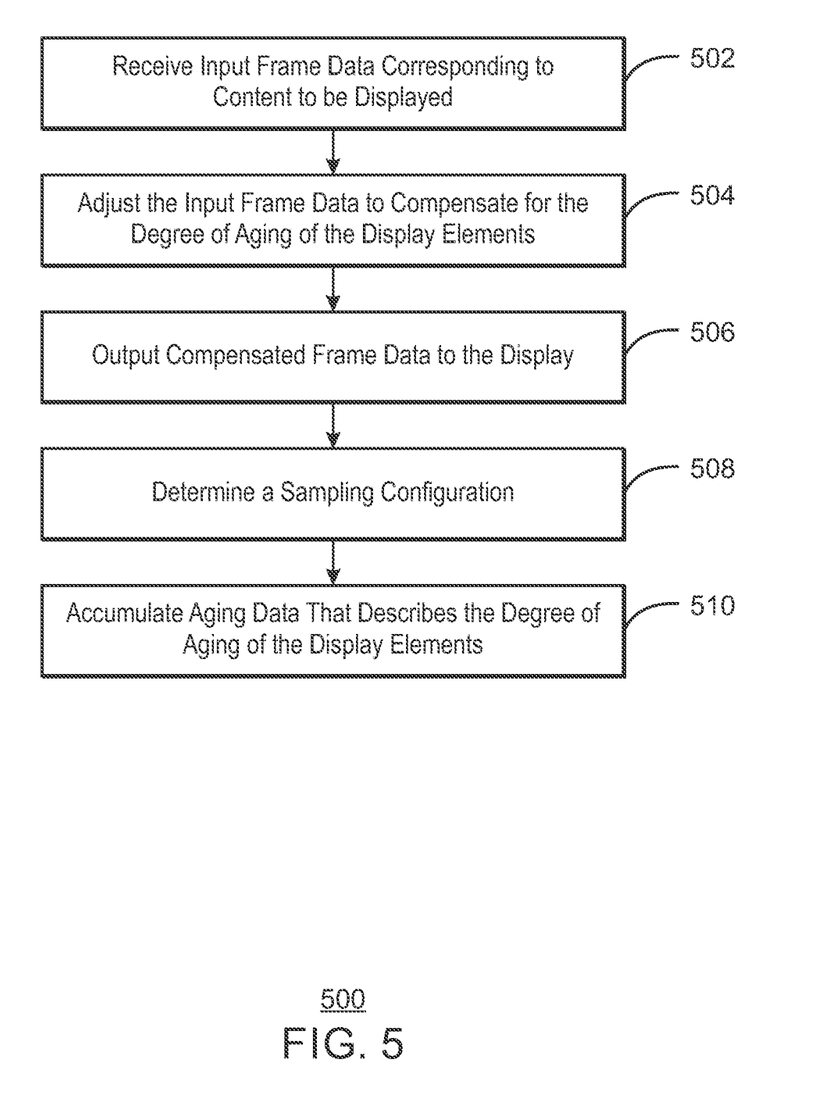
FIG. 5 is a process flow diagram of an example method to implement aging compensation for a display.

FIG. 5 is a process flow diagram of an example method to implement aging compensation for a display. The method 500 may be implemented by any suitable electronic device that includes a pixel-based display, such as the device shown in FIG. 1. The display can include a plurality of display elements, such as LEDs, OLEDs, and others. In some examples, the method 500 is performed by logic included in a graphics processor, such as the graphics processor of FIG. 2. The logic is embodied in hardware, such as logic circuitry, microcontrollers, integrate circuits, or one or more processors configured to execute instructions stored in a non-transitory, computer-readable medium.

At block 502, input frame data corresponding to content to be displayed is received. The content may be dynamic content such as video, or static content such as still images, for example. The content may also be a mixture of dynamic and static content.

At block 504, the input frame data is adjusted to generate output frame data that is compensated based on a degree of aging of the LEDs. The compensation may be applied to each pixel individually or groups of pixels may be receive the same level of compensation. For example, all of the pixels within a sampling segment may be compensated to the same level, based on the degree of aging accumulated for the sampling point.

At block 506, the compensated output frame data is sent to the display.

At block 508, a sampling configuration is determined. Determining the sampling configuration can include determining a first sampling configuration if the content to be displayed is dynamic and determining a second sampling configuration if the content to be displayed is static, wherein the second sampling configuration includes more sampling points and smaller sampling segments compared to the first sampling configuration. The type of content to be displayed can be determined by analyzing the input frame data to identify a degree of change in the input frame data from previous input frames. In some examples, the type of content to be displayed can be determined by receiving one or more content type identifiers from a source of the content, such as an operating system or other application running on a processor. In some examples, the sampling configuration itself can be received from the operating system or other application running on the processor. The sampling configuration can also include different areas of the display being configured differently based on the type of content to be displayed in each area. In some examples, the sampling configuration is static, in which case block 508 may be skipped or may be performed once, for example, during the booting or powering up of the electronic device or after user specified change to the sampling configuration.

At block 510, the output frame data is sampled in accordance with the sampling configuration to accumulate aging data that describes the degree of aging of the LEDs. The method may then return to block 502. The accumulated aging data from block 510 is used in the next iteration of the method at block 504.

The method 500 should not be interpreted as meaning that the blocks are necessarily performed in the order shown. Furthermore, fewer or greater actions can be included in the method 500 depending on the design considerations of a particular implementation.

Figure 6:
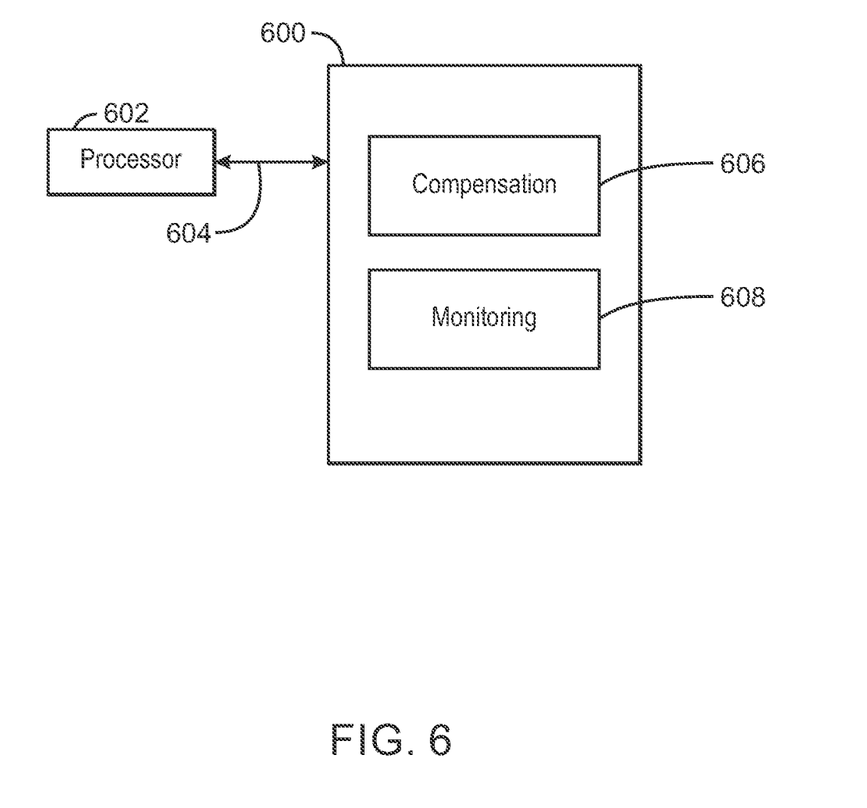
FIG. 6 is a block diagram showing a computer-readable medium that contains logic for performing aging compensation for a display.

FIG. 6 is a block diagram showing a computer-readable medium 600 that contains logic for performing aging compensation for a display. The medium 600 may be a computer-readable medium, including a non-transitory medium that stores code that can be accessed by a processor 602 over a computer bus 604. For example, the computer-readable medium 600 can be volatile or non-volatile data storage device. The medium 600 can also be a logic unit, such as an Application Specific Integrated Circuit (ASIC), a Field Programmable Gate Array (FPGA), or an arrangement of logic gates implemented in one or more integrated circuits, for example.

The medium 600 may include modules 606 and 608 configured to perform the techniques described herein. In some embodiments, the modules 606 and 608 may be modules of computer code configured to direct the operations of the processor 602. For example, the compensation module 606 may be configured to receive input frame data corresponding to content to be displayed on a display of an electronic device, adjust the input frame data based on a degree of aging of the LEDs, and send the output frame data to the display. The monitoring module may 608 be configured to sample the output frame data in accordance with a specified sampling configuration to accumulate aging data that describes the degree of aging of the LEDs. The sampling configuration can be determined based on a type of the content to be displayed.

The block diagram of FIG. 6 is not intended to indicate that the medium 600 is to include all of the components shown in FIG. 6. Further, the medium 600 may include any number of additional components not shown in FIG. 6, depending on the details of the specific implementation.

EXAMPLES

Example 1 is an electronic device to implement aging compensation for a display. The electronic device includes a display with pixels, each pixel including one or more Light Emitting Diodes (LEDs). The electronic device also includes a display aging compensation unit to receive input frame data corresponding to content to be displayed, adjust the input frame data to generate output frame data based on a degree of aging of the LEDs, and send the output frame data to the display. The electronic device also includes a display aging monitoring and compensation processing unit to accumulate aging data that describes the degree of aging of the LEDs. The aging data is to be accumulated by sampling the output frame data at a sampling point in accordance with a sampling configuration, wherein the aging data collected at the sampling point is applied to other pixels in a vicinity of the sampling point To reduce a size of a memory used to track the aging data, the display aging monitoring and compensation processing unit is to determine a degree of compensation to apply to the other pixels based on the aging data collected at the sampling point and an aging difference between the other pixels and the sampling point.

Example 2 includes the electronic device of example 1, including or excluding optional features. In this example, the sampling configuration varies depending on a type of the content to be displayed.

Example 3 includes the electronic device of any one of claims 1 to 2, including or excluding optional features. In this example, the sampling configuration is predetermined and does not change in response to a change in a type of the content to be displayed.

Example 4 includes the electronic device of any one of claims 1 to 3, including or excluding optional features. In this example, the display aging monitoring and compensation processing unit is to use a first sampling configuration if the content to be displayed is dynamic, and the display aging monitoring and compensation processing unit is to use a second sampling configuration if the content to be displayed is static, wherein the second sampling configuration includes more sampling points compared to the first sampling configuration.

Example 5 includes the electronic device of any one of claims 1 to 4, including or excluding optional features. In this example, the display aging compensation unit is included in a graphics processor, and the graphics processor determines a type of the content to be displayed based on a degree of change in the input frame data.

Example 6 includes the electronic device of any one of claims 1 to 5, including or excluding optional features. In this example, the sampling configuration is determined by an application that is to generate the content to be displayed, and the sampling configuration is based on a type of the content to be displayed in different areas of the display.

Example 7 includes the electronic device of any one of claims 1 to 6, including or excluding optional features. In this example, the sampling configuration includes a first area of the display to display dynamic content, the first area including a first plurality of pixels and a single sampling point for collecting aging data to be applied to all of the first plurality of pixels. In this example, the sampling configuration also includes a second area of the display to display static content, the second area including a second plurality of pixels, wherein the pixels in the second area of the display are sampled individually.

Example 8 includes the electronic device of any one of claims 1 to 7, including or excluding optional features. In this example, the aging difference is tracked using a smaller bit depth compared to the aging data collected at the sampling point.

Example 9 includes the electronic device of any one of claims 1 to 8, including or excluding optional features. In this example, the electronic device is a laptop computer.

Example 10 includes the electronic device of any one of claims 1 to 9, including or excluding optional features. In this example, the LEDs are Organic LEDs (OLEDs).

Example 11 is a method of implementing aging compensation for a display. The method includes receiving input frame data corresponding to content to be displayed on a display of an electronic device, the display including a plurality of Light Emitting Diodes (LEDs). The method also includes adjusting the input frame data to generate output frame data based on a degree of aging of the LEDs and sending the output frame data to the display. The method also includes accumulating aging data that describes the degree of aging of the LEDs by sampling the output frame data at one or more sampling points in accordance with a sampling configuration, wherein the aging data collected at each sampling point is used for other pixels in a vicinity of the sampling point. The method also includes computing a degree of compensation to apply to the other pixels based on the aging data collected at the sampling point and an aging difference between the other pixels and the sampling point.

Example 12 includes the method of example 11, including or excluding optional features. In this example, the method includes determining the sampling configuration based on a type of the content to be displayed.

Example 13 includes the method of any one of claims 11 to 12, including or excluding optional features. In this example, the sampling configuration is predetermined and does not change in response to a change in a type of the content to be displayed.

Example 14 includes the method of any one of claims 11 to 13, including or excluding optional features. In this example, the method includes determining the sampling configuration by determining a first sampling configuration if the content to be displayed is dynamic and determining a second sampling configuration if the content to be displayed is static, wherein the second sampling configuration includes more sampling points compared to the first sampling configuration.

Example 15 includes the method of any one of claims 11 to 14, including or excluding optional features. In this example, the method includes determining a type of the content to be displayed by analyzing the input frame data to identify a degree of change in the input frame data.

Example 16 includes the method of any one of claims 11 to 15, including or excluding optional features. In this example, the method includes receiving a content type identifier from a source of the content to be displayed and determining the sampling configuration based, at least in part, on the content type identifier.

Example 17 includes the method of any one of claims 11 to 16, including or excluding optional features. In this example, the method includes receiving the sampling configuration from a source of the content to be displayed.

Example 18 includes the method of any one of claims 11 to 17, including or excluding optional features. In this example, the sampling configuration includes a first area of the display to display dynamic content, the first area including a first plurality of pixels and a single sampling point for collecting aging data to be applied to all of the first plurality of pixels. In this example, the sampling configuration also includes a second area of the display to display static content, the second area including a second plurality of pixels, wherein the pixels in the second area of the display are sampled individually.

Example 19 includes the method of any one of claims 11 to 18, including or excluding optional features. In this example, the aging difference is tracked using a smaller bit depth compared to the aging data collected at the sampling point.

Example 20 includes the method of any one of claims 11 to 19, including or excluding optional features. In this example, the LEDs are Organic LEDs (OLEDs).

Example 21 is a computer-readable medium. The computer-readable medium includes instructions that direct the processor to receive input frame data corresponding to content to be displayed on a display of an electronic device, the display including a plurality of Light Emitting Diodes (LEDs). The computer-readable medium also includes instructions that direct the processor to adjust the input frame data to generate output frame data based on a degree of aging of the LEDs and send the output frame data to the display. The computer-readable medium also includes instructions that direct the processor to sample the output frame data at one or more sampling points in accordance with a sampling configuration to accumulate aging data that describes the degree of aging of the LEDs, wherein the aging data collected at each sampling point is used for other pixels in a vicinity of the sampling point. The computer-readable medium also includes instructions that direct the processor to compute a degree of compensation to apply to the other pixels based on the aging data collected at the sampling point and an aging difference between the other pixels and the sampling point.

Example 22 includes the computer-readable medium of example 21, including or excluding optional features. In this example, the computer-readable medium includes instructions to direct the processor to determine the sampling configuration based on a type of the content to be displayed.

Example 23 includes the computer-readable medium of any one of claims 21 to 22, including or excluding optional features. In this example, the sampling configuration is predetermined and does not change in response to a change in a type of the content to be displayed.

Example 24 includes the computer-readable medium of any one of claims 21 to 23, including or excluding optional features. In this example, the computer-readable medium includes instructions to determine the sampling configuration, wherein a first sampling configuration is to be used if the content to be displayed is dynamic and a second sampling configuration is to be used if the content to be displayed is static. The second sampling configuration includes more sampling points compared to the first sampling configuration.

Example 25 includes the computer-readable medium of any one of examples 21 to 24, including or excluding optional features. In this example, the computer-readable medium includes instructions to direct the processor to analyze the input frame data to determine a type of the content to be displayed based on a degree of change in the input frame data.

Example 26 includes the computer-readable medium of any one of examples 21 to 25, including or excluding optional features. In this example, the computer-readable medium includes instructions to direct the processor to receive a content type identifier from a source of the content to be displayed and determine the sampling configuration based, at least in part, on the content type identifier.

Example 27 includes the computer-readable medium of any one of examples 21 to 26, including or excluding optional features. In this example, the computer-readable medium includes instructions to direct the processor to receive the sampling configuration from a source of the content to be displayed.

Example 28 includes the computer-readable medium of any one of examples 21 to 27, including or excluding optional features. In this example, the sampling configuration includes a first area of the display with a first plurality of pixels and a single sampling point for collecting aging data to be applied to all of the first plurality of pixels. In this example, the sampling configuration also includes a second area of the display with a second plurality of pixels, wherein the pixels in the second area of the display are sampled individually. Optionally, the first area of the display is to display dynamic content and the second area of the display is to display static content.

Example 29 includes the computer-readable medium of any one of examples 21 to 28, including or excluding optional features. In this example, the LEDs are Organic LEDs (OLEDs).

Example 30 is an electronic device to implement aging compensation for a display of the electronic device. The electronic device includes logic to receive input frame data corresponding to content to be displayed on a display of an electronic device, the display including a plurality of Light Emitting Diodes (LEDs). The electronic device also includes logic to adjust the input frame data to generate output frame data based on a degree of aging of the LEDs and send the output frame data to the display. The electronic device also includes logic to sample the output frame data at one or more sampling points in accordance with a sampling configuration to accumulate aging data that describes the degree of aging of the LEDs, wherein the aging data collected at each sampling point is used for other pixels in a vicinity of the sampling point. The electronic device also includes logic to compute a degree of compensation to apply to the other pixels based on the aging data collected at the sampling point and an aging difference between the other pixels and the sampling point.

Example 31 includes the electronic device of example 30, including or excluding optional features. In this example, the electronic device includes logic to determine the sampling configuration based on a type of the content to be displayed.

Example 32 includes the electronic device of any one of examples 30 to 31, including or excluding optional features. In this example, the sampling configuration is predetermined and does not change in response to a change in a type of the content to be displayed.

Example 33 includes the electronic device of any one of examples 30 to 32, including or excluding optional features. In this example, the electronic device includes logic to determine the sampling configuration, wherein a first sampling configuration is to be used if the content to be displayed is dynamic and a second sampling configuration is to be used if the content to be displayed is static. The second sampling configuration includes more sampling points compared to the first sampling configuration.

Example 34 includes the electronic device of any one of examples 30 to 33, including or excluding optional features. In this example, the electronic device includes logic to analyze the input frame data to determine a type of the content to be displayed based on a degree of change in the input frame data.

Example 35 includes the electronic device of any one of examples 30 to 34, including or excluding optional features. In this example, the electronic device includes logic to receive a content type identifier from a source of the content to be displayed and determine the sampling configuration based, at least in part, on the content type identifier.

Example 36 includes the electronic device of any one of examples 30 to 35, including or excluding optional features. In this example, the electronic device includes logic to receive the sampling configuration from a source of the content to be displayed.

Example 37 includes the electronic device of any one of examples 30 to 36, including or excluding optional features. In this example, the sampling configuration includes a first area of the display with a first plurality of pixels and a single sampling point for collecting aging data to be applied to all of the first plurality of pixels. In this example, the sampling configuration also includes a second area of the display with a second plurality of pixels, wherein the pixels in the second area of the display are sampled individually. Optionally, the first area of the display is to display dynamic content and the second area of the display is to display static content.

Example 38 includes the electronic device of any one of examples 30 to 37, including or excluding optional features. In this example, the LEDs are Organic LEDs (OLEDs).

Example 39 is an apparatus configured to implement aging compensation for a display. The apparatus includes means for receiving input frame data corresponding to content to be displayed on a display of an electronic device, the display including a plurality of Light Emitting Diodes (LEDs). The apparatus also includes means for adjusting the input frame data to generate output frame data based on a degree of aging of the LEDs and sending the output frame data to the display. The apparatus also includes means for accumulating aging data that describes the degree of aging of the LEDs by sampling the output frame data at one or more sampling points in accordance with a sampling configuration, wherein the aging data collected at each sampling point is used for other pixels in a vicinity of the sampling point. The apparatus includes means for computing a degree of compensation to apply to the other pixels based on the aging data collected at the sampling point and an aging difference between the other pixels and the sampling point.

Example 40 includes the apparatus of example 39, including or excluding optional features. In this example, the apparatus includes means for determining the sampling configuration based on a type of the content to be displayed.

Example 41 includes the apparatus of any one of examples 39 to 40, including or excluding optional features. In this example, the sampling configuration is predetermined and does not change in response to a change in a type of the content to be displayed.

Example 42 includes the apparatus of any one of examples 39 to 41, including or excluding optional features. In this example, the apparatus includes means for determining the sampling configuration by determining a first sampling configuration if the content to be displayed is dynamic and determining a second sampling configuration if the content to be displayed is static, wherein the second sampling configuration includes more sampling points compared to the first sampling configuration.

Example 43 includes the apparatus of any one of examples 39 to 42, including or excluding optional features. In this example, the apparatus includes means for determining the type of the content to be displayed by analyzing the input frame data to identify a degree of change in the input frame data.

Example 44 includes the apparatus of any one of examples 39 to 43, including or excluding optional features. In this example, the apparatus includes means for receiving a content type identifier from a source of the content to be displayed and determining the sampling configuration based, at least in part, on the content type identifier.

Example 45 includes the apparatus of any one of examples 39 to 44, including or excluding optional features. In this example, the apparatus includes means for receiving the sampling configuration from a source of the content to be displayed.

Example 46 includes the apparatus of any one of examples 39 to 45, including or excluding optional features. In this example, the sampling configuration includes a first area of the display to display dynamic content, the first area including a first plurality of pixels and a single sampling point for collecting aging data to be applied to all of the first plurality of pixels. In this example, the sampling configuration also includes a second area of the display to display static content, the second area including a second plurality of pixels, wherein the pixels in the second area of the display are sampled individually.

Example 47 includes the apparatus of any one of examples 39 to 46, including or excluding optional features. In this example, the aging difference is tracked using a smaller bit depth compared to the aging data collected at the sampling point.

Example 48 includes the apparatus of any one of examples 39 to 47, including or excluding optional features. In this example, the LEDs are Organic LEDs (OLEDs).

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device comprising:
a display comprising pixels, each pixel comprising one or more Light Emitting Diodes (LEDs);
display aging compensation circuitry to receive input frame data corresponding to content to be displayed, adjust the input frame data to generate output frame data based on a degree of aging of the LEDs, and send the output frame data to the display; and
display aging monitoring and compensation circuitry to accumulate aging data that describes the degree of aging of the LEDs, wherein the aging data is to be accumulated by sampling the output frame data at a sampling point in accordance with a sampling configuration, wherein the aging data collected at the sampling point is applied to other pixels in a vicinity of the sampling point;
wherein, to reduce a size of a memory used to track the aging data, the display aging monitoring and compensation circuitry is to determine a degree of compensation to apply to the other pixels based on the aging data collected at the sampling point and an aging difference between the other pixels and the sampling point wherein the aging difference is tracked using a smaller bit depth compared to the aging data collected at the sampling point.

2. The electronic device of claim 1, wherein the sampling configuration varies depending on a type of the content to be displayed.

3. The electronic device of claim 1, wherein the sampling configuration is predetermined and does not change in response to a change in a type of the content to be displayed.

4. The electronic device of claim 1, wherein the display aging monitoring and compensation processing unit is to use a first sampling configuration if the content to be displayed is dynamic, and the display aging monitoring and compensation processing unit is to use a second sampling configuration if the content to be displayed is static, wherein the second sampling configuration includes more sampling points compared to the first sampling configuration.

5. The electronic device of claim 1, wherein the display aging compensation unit is included in a graphics processor, and the graphics processor determines a type of the content to be displayed based on a degree of change in the input frame data.

6. The electronic device of claim 1, wherein the sampling configuration is determined by an application that is to generate the content to be displayed, and the sampling configuration is based on a type of the content to be displayed in different areas of the display.

7. The electronic device of claim 1, wherein the sampling configuration comprises:
a first area of the display to display dynamic content, the first area comprising a first plurality of pixels and a single sampling point for collecting aging data to be applied to all of the first plurality of pixels; and
a second area of the display to display static content, the second area comprising a second plurality of pixels, wherein the pixels in the second area of the display are sampled individually.

8. The electronic device of claim 1, wherein the electronic device is a laptop computer.

9. The electronic device of claim 1, wherein the LEDs are Organic LEDs (OLEDs).

10. A method, comprising:
receiving input frame data corresponding to content to be displayed on a display of an electronic device, the display comprising a plurality of Light Emitting Diodes (LEDs);
adjusting the input frame data to generate output frame data based on a degree of aging of the LEDs and sending the output frame data to the display;
accumulating aging data that describes the degree of aging of the LEDs by sampling the output frame data at one or more sampling points in accordance with a sampling configuration, wherein the aging data collected at each sampling point is used for other pixels in a vicinity of the sampling point; and
computing a degree of compensation to apply to the other pixels based on the aging data collected at the sampling point and an aging difference between the other pixels and the sampling point wherein the aging difference is tracked using a smaller bit depth compared to the aging data collected at the sampling point.

11. The method of claim 10, comprising determining the sampling configuration based on a type of the content to be displayed.

12. The method of claim 10, wherein the sampling configuration is predetermined and does not change in response to a change in a type of the content to be displayed.

13. The method of claim 10, comprising determining the sampling configuration by determining a first sampling configuration if the content to be displayed is dynamic and determining a second sampling configuration if the content to be displayed is static, wherein the second sampling configuration includes more sampling points compared to the first sampling configuration.

14. The method of claim 10, comprising determining a type of the content to be displayed by analyzing the input frame data to identify a degree of change in the input frame data.

15. The method of claim 10, comprising receiving a content type identifier from a source of the content to be displayed and determining the sampling configuration based, at least in part, on the content type identifier.

16. A non-transitory computer-readable medium, comprising instructions to direct a processor to implement aging compensation for a display, the instructions to direct the processor to:
receive input frame data corresponding to content to be displayed on a display of an electronic device, the display comprising a plurality of Light Emitting Diodes (LEDs);
adjust the input frame data to generate output frame data based on a degree of aging of the LEDs and send the output frame data to the display;
sample the output frame data at one or more sampling points in accordance with a sampling configuration to accumulate aging data that describes the degree of aging of the LEDs, wherein the aging data collected at each sampling point is used for other pixels in a vicinity of the sampling point; and
compute a degree of compensation to apply to the other pixels based on the aging data collected at the sampling point and an aging difference between the other pixels and the sampling point wherein the aging difference is tracked using a smaller bit depth compared to the aging data collected at the sampling point.

17. The non-transitory computer-readable medium of claim 16, comprising instructions to direct the processor to determine the sampling configuration based on a type of the content to be displayed.

18. The non-transitory computer-readable medium of claim 16, wherein the sampling configuration is predetermined and does not change in response to a change in a type of the content to be displayed.

19. The non-transitory computer-readable medium of claim 16, comprising instructions to determine the sampling configuration, wherein a first sampling configuration is to be used if the content to be displayed is dynamic and a second sampling configuration is to be used if the content to be displayed is static, wherein the second sampling configuration includes more sampling points compared to the first sampling configuration.

20. The non-transitory computer-readable medium of claim 16, comprising instructions to direct the processor to analyze the input frame data to determine a type of the content to be displayed based on a degree of change in the input frame data.

21. The non-transitory computer-readable medium of claim 16, comprising instructions to direct the processor to receive a content type identifier from a source of the content to be displayed and determine the sampling configuration based, at least in part, on the content type identifier.

22. The non-transitory computer-readable medium of claim 16, comprising instructions to direct the processor to receive the sampling configuration from a source of the content to be displayed.

23. The non-transitory computer-readable medium of claim 16, wherein the sampling configuration comprises:

a first area of the display comprising a first plurality of pixels and a single sampling point for collecting aging data to be applied to all of the first plurality of pixels; and a second area of the display comprising a second plurality of pixels, wherein the pixels in the second area of the display are sampled individually.

* * * * *